United States Patent
Stapleton et al.

(10) Patent No.: US 9,352,857 B2
(45) Date of Patent: May 31, 2016

(54) URINE STOWAGE SYSTEM FOR SPACECRAFT

(75) Inventors: Thomas J. Stapleton, Southwick, MA (US); Charles H. Todd, IV, Webster, TX (US); Terrell Lee Morrison, League City, TX (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 485 days.

(21) Appl. No.: 13/488,570

(22) Filed: Jun. 5, 2012

(65) Prior Publication Data

US 2013/0318701 A1   Dec. 5, 2013

(51) Int. Cl.
*B64D 11/02* (2006.01)
*B64G 1/60* (2006.01)
*E03D 3/10* (2006.01)

(52) U.S. Cl.
CPC .... *B64G 1/60* (2013.01); *E03D 3/10* (2013.01)

(58) Field of Classification Search
CPC ............ E03D 3/10; B64D 11/02; B64G 1/60
USPC ........................ 4/144.1–144.4, 316, 321–323, 4/431–433, 319
See application file for complete search history.

(56) References Cited

U.S. PATENT DOCUMENTS

| | | | |
|---|---|---|---|
| 3,329,974 A * | 7/1967 | Belasco et al. | 4/316 |
| 3,482,267 A * | 12/1969 | Liljendahl | 4/431 |
| 4,063,315 A * | 12/1977 | Carolan et al. | 4/316 |
| 4,275,470 A * | 6/1981 | Badger et al. | 4/316 |
| 4,870,709 A | 10/1989 | Thornton, Jr. et al. | |
| 4,937,891 A | 7/1990 | Thornton, Jr. et al. | |
| 5,005,457 A | 4/1991 | Thornton, Jr. et al. | |
| 5,369,811 A * | 12/1994 | Serre | 4/213 |
| 5,484,521 A | 1/1996 | Kramer | |
| 5,622,621 A | 4/1997 | Kramer | |
| 5,894,608 A | 4/1999 | Birbara | |
| 6,093,387 A | 7/2000 | Birbara et al. | |
| 6,258,215 B1 * | 7/2001 | Samsonov et al. | 4/459 |
| 7,169,197 B2 | 1/2007 | Serio et al. | |
| 7,410,588 B2 | 8/2008 | Klemic | |
| 2010/0084592 A1 * | 4/2010 | Hoang | E03F 1/006 261/129.15 |

* cited by examiner

*Primary Examiner* — Lauren Crane
*Assistant Examiner* — Erin Deery
(74) *Attorney, Agent, or Firm* — Carlson, Gaskey & Olds, P.C.

(57) ABSTRACT

A waste handling system includes a waste processing unit that includes a urine inlet configured to receive urine from a urinal. A pumping element is fluidly connected between the urine inlet and the urine outlet. A distribution system with a differential pressure valve selectively fluidly connects the urine outlet to first and second urine storage containers. The distribution system includes a switching system that selectively fluidly connects the urinal to the first and second urinal storage containers in response to an input. Each urine storage containers includes a cavity with a bag. The bag is movable between first and second volumes. An electrical switch communicates with the bag and includes first and second contact elements biased apart from one another in a first condition that corresponds to the first volume. The first and second contact elements electrically engage one another in a second condition corresponding to the second volume.

20 Claims, 3 Drawing Sheets

URINE STOWAGE SYSTEM FOR SPACECRAFT

BACKGROUND

This disclosure relates to a waste handling system, such as a urine stowage system for a spacecraft.

Excluding diapers, there are currently two solutions regarding urine management in orbit. The first solution is to vent the urine overboard, which has been employed on the Shuttle Orbiter and other prior United States spaceships. The second solution is to stow the urine on board, which has been employed in the Soviet/Russian Soyuz spaceship and the International Space Station. Stowing urine on board has become the desired approach for new spacecraft.

On the Soyuz spaceship, urine is absorbed by a product placed inside of a canister. The canister is emptied after return to Earth, limiting urine stowage to the volume of the canister. In the International Space Station, the urine is pumped directly to a urine processor, where urine is processed and plumbed to the water processor for further processing to produce potable water.

SUMMARY

In one example embodiment, a waste handling system includes a waste processing unit that includes a urine inlet configured to receive urine. A pumping element is fluidly connected between the urine inlet and the urine outlet. The waste handling system includes a urine storage container. A differential pressure valve selectively fluidly connects the urine outlet to the urine storage container. The differential pressure valve includes first, second and third pressure inputs. The first pressure input corresponds to a pressure from the urinal outlet. The second pressure input corresponds to a pressure from the urine storage container, and the third pressure input corresponds to a reference pressure. The differential pressure valve is configured to open and close in response to a differential pressure between the first and third pressures.

In another example embodiment, a waste handling system includes a urinal and first and second urine storage containers. A distribution system fluidly interconnects the urinal to the first and second urine storage containers. The distribution system includes a switching system that selectively fluidly connects the urinal to at least one of the first and second urinal storage containers in response to an input.

In another example embodiment, a waste handling system includes a urine storage container that includes a cavity having a bag. The bag is movable within the cavity between first and second volumes. An electrical switch communicates with the bag. The electrical switch includes first and second contact elements biased apart from one another in a first condition that corresponds to the first volume and electrically engages one another in a second condition corresponding to the second volume.

In another example embodiment, a waste handling system includes a urine storage container having a cavity having a bag. The bag is moveable within the cavity between first and second volumes. A mechanical device is configured to be actuated in response to the bag changing from the first volume to the second volume. The mechanical device provides a visual indicator of the bag being full at the second volume.

BRIEF DESCRIPTION OF THE DRAWINGS

The disclosure can be further understood by reference to the following detailed description when considered in connection with the accompanying drawings wherein.

DETAILED DESCRIPTION

Figure 1:
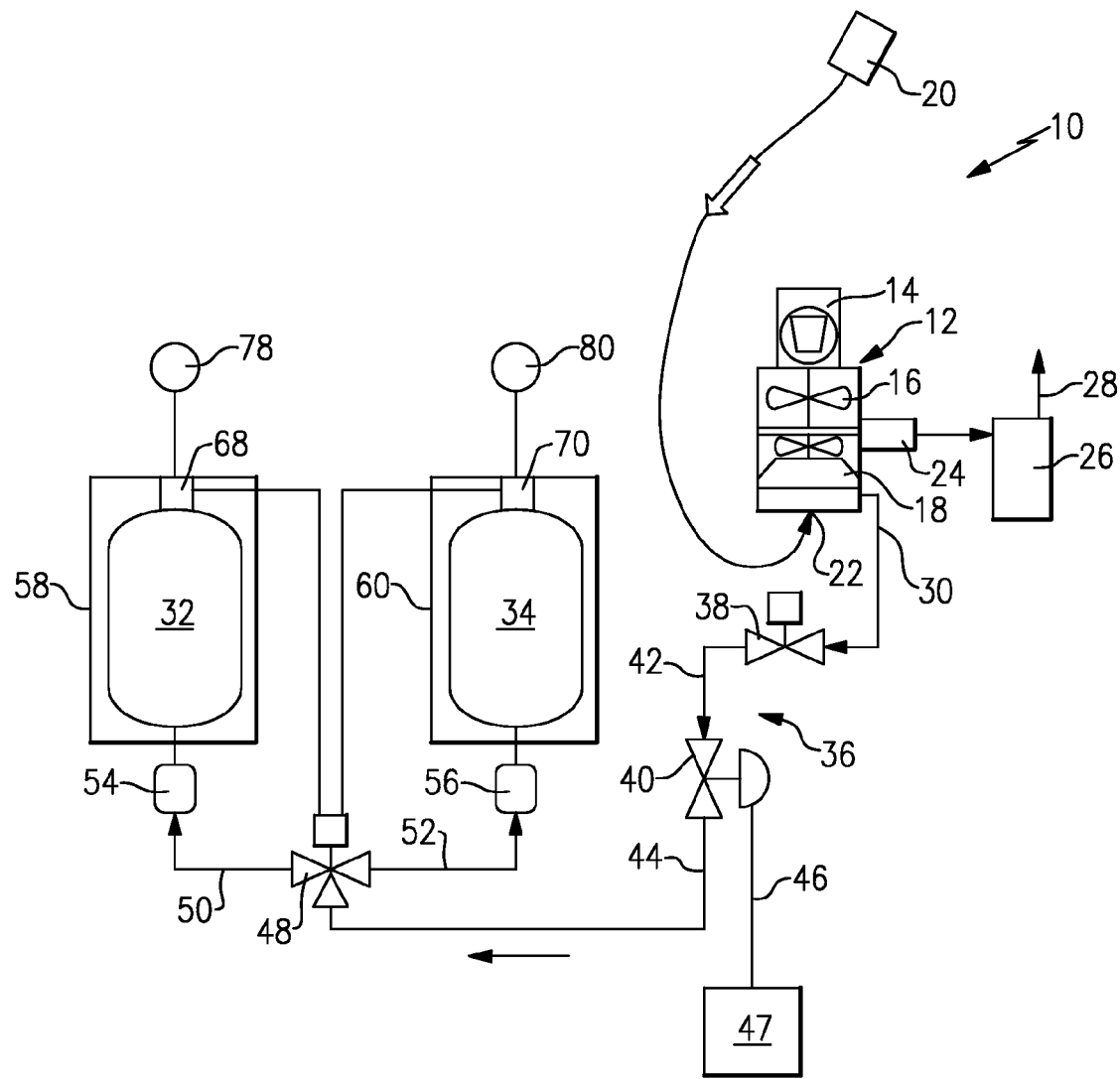
FIG. 1 is a highly schematic view of a waste handling system.

A waste handling system 10 is schematically illustrated in FIG. 1. The system 10 includes a waste processing unit 12 having a motor 14 that rotationally drives a fan 16 and a pumping element, such as a urine separator 18. A urinal 20 is fluidly connected to a urinal inlet 22 of the unit 12. The separator 18 receives urine from the urinal 20, which is a mixture of urine and air. The separator 18 separates the urine and air from one another. The air is expelled from the unit 12 through an air outlet 24 that provides the air to a filter 26. The filter 26 neutralizes odor and bacteria and vents the filtered air through a vent 28, which may be provided back to a cabin, for example.

The separated urine is expelled through a urine outlet 30 of the unit 12. The urine is provided to first and second urine bags 32, 34 through a distribution system 36. In one example, the distribution system 36 includes a shut-off valve 38 that can be moved mechanically or electrically between opened and closed positions to selectively connect the unit 12 to the first and second urine bags 32, 34, for example, to service or replace the unit 12. A differential pressure valve 40 is provided downstream from the shut-off valve 38. The differential pressure valve 40 is fluidly connected to an upstream separator line 42 and a downstream main bag line 44. The differential pressure valve 40 is configured to automatically open in response to a selected differential pressure provided, in part, by pressurized urine provided from the separator line 42. In one example, the differential pressure is about 20 psi.

In one example, the differential pressure valve may be a simple check valve. However, the pressure in the main bag line may increase as the urine bags 32, 34 fill, which reduces the differential pressure, possibly below the differential pressure needed to open the check valve to continue to fully fill the bags. In another example, rather than providing a simple check valve, the differential pressure valve 40 may use a reference pressure that remains generally constant. For example, the differential pressure valve may be in fluid communication with a cabin 47 and its associated cabin pressure through a cabin line 46. Such a configuration ensures that the differential pressure across the differential pressure valve 40 will not vary based upon the pressure within the first and second urine bags 32, 34. It should be understood that a reference pressure other than cabin pressure may be used.

The main bag line 44 is in fluid communication with a flow diverter valve 48, which is fluidly connected to first and second bag lines 50, 52 on a downstream side of the flow diverter valve 48. The first and second bag lines 50, 52 are respectively fluidly connected to the first and second urine bags 32, 34. First and second quick disconnects 54, 56 may be provided between the first and second bag lines 50, 52 and the first and second urine bags 32, 34, respectively, to facilitate a quick and easy change of a full urine bag with a new, empty urine bag.

Figure 2:
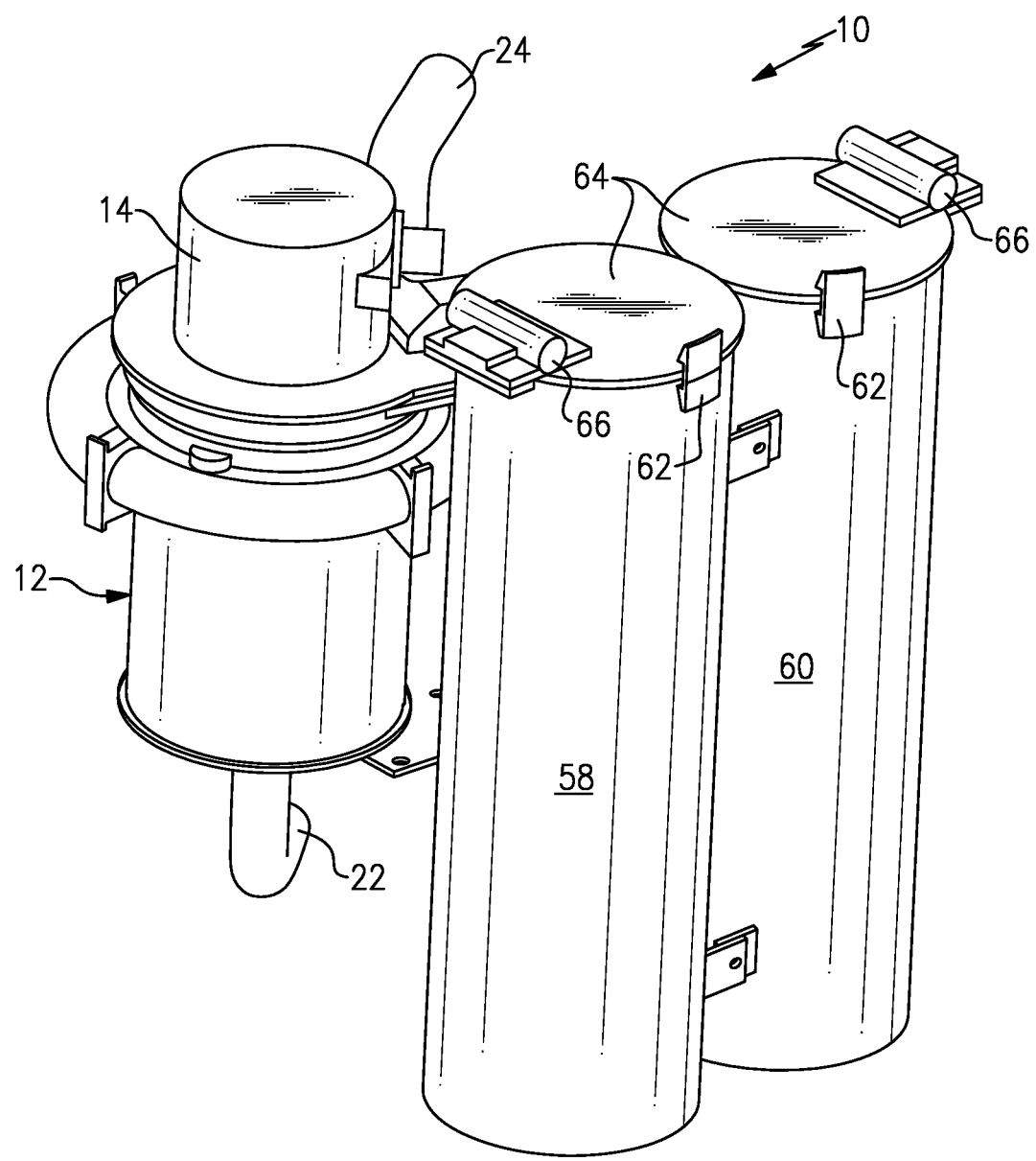
FIG. 2 is a schematic perspective view of a waste processing unit and urine storage containers.

In the example, the first and second urine bags 32, 34 are flexible containers that expand as urine fills the bags. Each of the first and second urine bags 32, 34 are respectively housed within rigid first and second containers 58, 60, which are shown in more detail in FIG. 2. In the example, the containers are provided by cylindrical bodies, although it may be desirable to include a taper such that the base diameter is less than the open end diameter where the bag is intended to be removed. This would allow the bags to be removed more easily from the first and second containers 58, 60. Each of the first and second containers 58, 60 includes a lid 64 pivotally attached to the container housing by a hinge 66, as shown in FIG. 2. A double latch 62 may be used to maintain the lid 64 in a closed condition. Initial release of the latch 62 permits the lid 64 to open a fixed distance relative to the container body, which ensures that the urine bag does not unexpectedly rupture under pressure with the lid fully open, or release more energy than the operator should be exposed to. The latch 62 may then be fully released to fully open the lid 64 and permit removal of the bag. An alternate safety mechanism may be included to expand the internal volume prior to opening the access door, for example, a cam that the operator actuates to move an internal pressure plate.

In one example, the flow diverter valve 48 automatically switches between the first and second urine bags 32, 34 in response to an input, which may be based upon the condition of the urine bag within its respective container. The input may be provided by a command signal from a switching system. When one urine bag becomes full, the flow diverter valve 48 is commanded to automatically block flow to the filled bag and to permit flow to the other urine bag, which is empty, enabling the full urine bag to be changed.

The first and second containers 58, 60 respectively include first and second switches 68, 70 in communication with the flow diverter valve 48. Each switch communicates with its respective bag and provides the command signal when the bag is full. The switching system may also include first and second indicators 78, 80, such as lights, which provides a visual indication when the bag is full. Other non-electrical visual indicators maybe used to simplify the system, a color coded wheel may turn as the bag reaches capacity, for instance.

Figure 3:
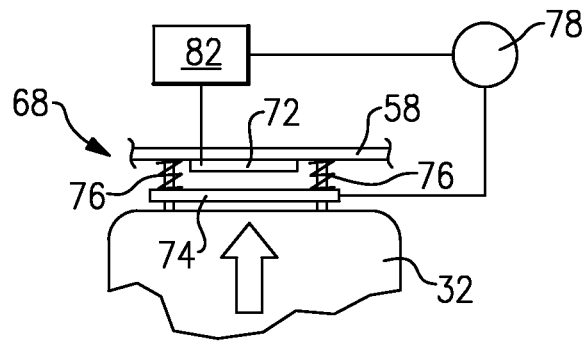
FIG. 3 is a schematic view of an example switch configured to indicate when a urine bag is full.

One example switch configuration is schematically illustrated in FIG. 3. The bag changes volume within the storage container as the bag transitions from empty to full. The switch 68 includes first and second contacts 72, 74 that are spaced apart from one another when the urine bag is not full. A biasing member 76 maintains separation between the first and second contacts 72, 74. As the urine bag 32 fills, the second contact 74 is moved into engagement with the first contact 72, closing the circuit between a power source 82 and the first indicator 78. The closed circuit may also provide the command signal to the flow diverter valve, as described above.

Figure 4:
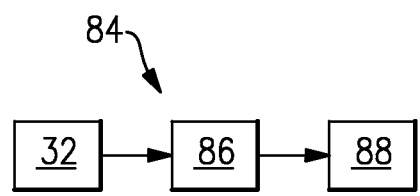
FIG. 4 is a schematic view of a urine stowage system in which a urine container is further processed to provide potable water.

The "bagged" urine may be recycled according to the system 84 schematically illustrated in FIG. 4. The urine, which accounts for three quarters of consumed potable water, will replace the volume that was filled with potable water during launch. The bag 32 from one spacecraft may be brought to a remote water processing unit 84, for example, at the International Space Station, to produce potable water 88. This can add to the station's water production and lighten the transport spaceship prior to re-entry.

As an alternative, the urine may be pumped from the separator directly to a tank that may be part of this system, or reside elsewhere in the ship. As another alternative, the urine may be pumped from the urine separator directly to a single bag. The operator would be alerted, using the methods described above, when the bag has reached its predetermined or selected volume limit. The volume limit would, for example, include adequate empty volume to accommodate the last user.

Figure 5:
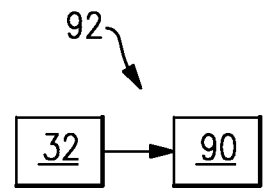
FIG. 5 is a schematic view of a urine stowage system in which the urine container is stored subsequent to replacement.

The bag 32 may be stowed in a system 92 shown in FIG. 5. The full bag 32 is placed in a storage container 90. In one example, the storage container 90 is capable of protecting the bag 32 from vacuum environment.

Figure 6:
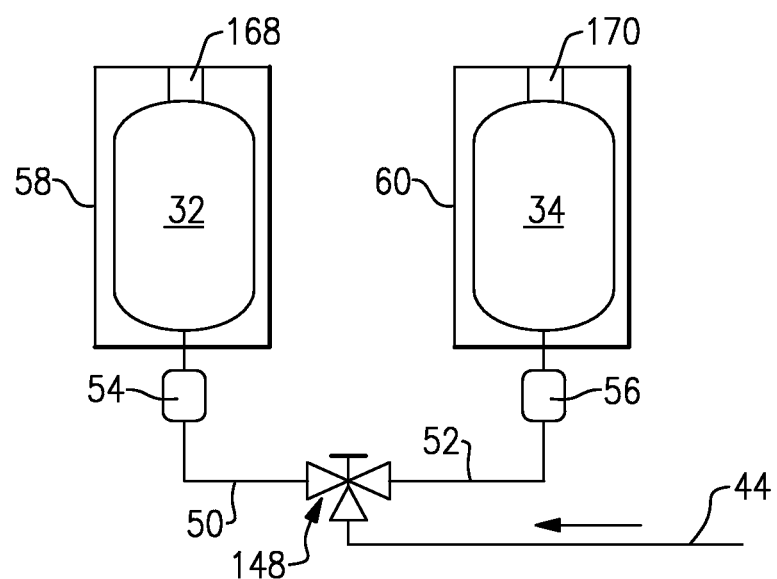
FIG. 6 is a schematic view of a portion of another example waste handling system.

Another example waste handling system is shown in FIG. 6 for switching between multiple bags. The first and second containers 58, 60 house first and second bags 32, 34. The main bag line 44 provides urine to the first and second bags 32, 34 through a mechanical flow diverter valve 148 that selectively supplies urine to the first and second bags 32, 34 via first and second bag lines 50, 52 and first and second quick connects 54, 56.

Each of the first and second containers 58, 60 include a mechanical device 168, 170 that is configured to provide a visual indicator of the bag being full when the first and second bags 32, 34 become full at a second volume. In one example, the full bag cooperates with the mechanical device to provide a colored visual indication that the bag is full by positioning a color indicator in a window on the lid, for example. A member of the crew upon seeing the visual indication of the bag being full may manually actuate the flow diverter valve 142 to switch the flow or urine from the main bag line 44 to the other bag.

Although an example embodiment has been disclosed, a worker of ordinary skill in this art would recognize that certain modifications would come within the scope of the claims. For that reason, the following claims should be studied to determine their true scope and content.

What is claimed is:

1. A waste handling system comprising:
    a waste processing unit including a urinal inlet configured to receive urine, a urinal outlet, and a pumping element fluidly connected between the urinal inlet and the urinal outlet;
    a urine storage container; and
    a differential pressure valve selectively fluidly connecting the urinal outlet to the urine storage container, the differential pressure valve includes first, second and third pressure inputs, the first pressure input corresponding to a pressure from the urinal outlet, the second pressure input corresponding to a pressure from the urine storage container, and the third pressure input corresponding to a reference pressure, the differential pressure valve configured to open and close in response to a differential pressure between the first and third pressures.

2. The system according to claim 1, wherein the differential pressure valve is configured to automatically open at a selected pressure differential.

3. The system according to claim 2, wherein the reference pressure is generally constant and the second pressure increases as the urine storage container transitions from an empty condition to a full condition.

4. The system according to claim 3, wherein the reference pressure corresponds to a cabin pressure.

5. The system according to claim 2, comprising a shut-off valve fluidly arranged between the urinal outlet and the differential pressure valve.

6. A waste handling system comprising:
- a urinal;
- first and second urine storage containers;
- a waste processing unit including a urinal inlet configured to receive urine, a urinal outlet, and a pumping element fluidly connected between the urinal inlet and the urinal outlet;
- a distribution system fluidly interconnecting the urinal to the first and second urine storage containers, the distribution system includes a switching system selectively fluidly connecting the urinal outlet to at least one of the first and second urinal storage containers in response to an input; and
- a differential pressure valve selectively fluidly connecting the urinal outlet to the urine storage container, the differential pressure valve includes first, second and third pressure inputs, the first pressure input corresponding to a pressure from the urinal outlet, the second pressure input corresponding to a pressure from the urine storage containers, and the third pressure input corresponding to a reference pressure, the differential pressure valve configured to open and close in response to a differential pressure between the first and third pressures.

7. The system according to claim 6, wherein the urine storage container includes a cavity having a bag, the bag movable within the cavity between first and second volumes.

8. The system according to claim 7, wherein the bag includes a quick disconnect removably coupled to the distribution system.

9. The system according to claim 8, comprising a water processing unit configured to produce potable water, the bag configured to be coupled to the water processing unit by the quick disconnect to generate potable water from the urine.

10. The system according to claim 8, comprising a storage container and a new bag, the storage container configured to receive a full bag from one of the first and second storage containers, and the new bag configured to replace the full bag and connect to the distribution system at the quick disconnect.

11. The system according to claim 6, wherein the switching system includes a flow diverter valve, and the input corresponds to a command signal to the flow diverter valve, the command signal commanding the flow diverter valve between first and second positions respectively corresponding to a fluid connection between the first and second urine storage containers and the urinal and a fluid disconnect between the other of the first and second urine storage containers and the urinal.

12. The system according to claim 11, wherein the switching system includes a switch configured to provide the command signal.

13. The system according to claim 12, comprising a light electrically connected to the switch, the light configured to illuminate during a full bag condition.

14. The system according to claim 12, wherein the flow diverter valve automatically switches between the first and second urine storage bags in response to the command signal.

15. The system according to claim 12, wherein a switch is arranged in each of the first and second urine storage containers, each switch including first and second contact elements biased apart from one another in a first condition corresponding to a first volume, and electrically engaging one another in a second condition corresponding to the second volume.

16. A waste handling system comprising:
- a urine storage container including a cavity having a bag, the bag movable within the cavity between first and second volumes;
- an electrical switch communicates with the bag, the electrical switch including first and second contact elements biased apart from one another in a first condition corresponding to the first volume and electrically engaging one another in a second condition corresponding to a second volume;
- a waste processing unit including a urinal inlet configured to receive urine, a urinal outlet, and a pumping element fluidly connected between the urinal inlet and the urinal outlet; and
- a differential pressure valve selectively fluidly connecting the urinal outlet to the urine storage container, the differential pressure valve includes first, second and third pressure inputs, the first pressure input corresponding to a pressure from the urinal outlet, the second pressure input corresponding to a pressure from the urine storage container, and the third pressure input corresponding to a reference pressure, the differential pressure valve configured to open and close in response to a differential pressure between the first and third pressures.

17. The system according to claim 16, comprising a light electrically connected to the switch, the light configured to illuminate during a full bag condition.

18. The system according to claim 16, wherein a flow diverter valve is in communication with the switch, and switch provides a command signal to the flow diverter valve, which is configured to change between first and second positions corresponding respectively to a fluid connection between the urine storage container and another urine storage container.

19. A waste handling system comprising;
- a urine storage container including a cavity having a bag, the bag movable within the cavity between first and second volumes; and
- a mechanical device configured to be actuated in response to the bag changing from the first volume to the second volume, the mechanical device providing a visual indicator of the bag being full at the second volume;
- a waste processing unit including a urinal inlet configured to receive urine, a urinal outlet, and a pumping element fluidly connected between the urinal inlet and the urinal outlet; and
- a differential pressure valve selectively fluidly connecting the urinal outlet to the urine storage container, the differential pressure valve includes first, second and third pressure inputs, the first pressure input corresponding to a pressure from the urinal outlet, the second pressure input corresponding to a pressure from the urine storage container, and the third pressure input corresponding to a reference pressure, the differential pressure valve configured to open and close in response to a differential pressure between the first and third pressures.

20. The system according to claim 19, comprising a manual flow diverter valve configured to be manually change between first and second positions corresponding respectively to a fluid connection between the urine storage container and another urine storage container.

* * * * *